United States Patent
Bujard

(10) Patent No.: US 7,291,216 B2
(45) Date of Patent: Nov. 6, 2007

(54) PLATELET-SHAPED PIGMENTS

(75) Inventor: Patrice Bujard, Courtepin (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 127 days.

(21) Appl. No.: 10/542,036

(22) PCT Filed: Jan. 15, 2004

(86) PCT No.: PCT/EP2004/000249

§ 371 (c)(1),
(2), (4) Date: Jul. 13, 2005

(87) PCT Pub. No.: WO2004/065492

PCT Pub. Date: Aug. 5, 2004

(65) Prior Publication Data

US 2006/0048676 A1    Mar. 9, 2006

(30) Foreign Application Priority Data

Jan. 23, 2003    (EP) .................... 03405026

(51) Int. Cl.
*C09C 1/00*    (2006.01)
(52) U.S. Cl. .................. 106/415; 106/400; 106/404; 106/481; 106/482; 106/31.65; 427/255.7
(58) Field of Classification Search ............ 106/400, 106/481, 404, 415, 482, 31.65; 427/255.7
See application file for complete search history.

(56) References Cited

U.S. PATENT DOCUMENTS 5,766,335 A    6/1998   Bujard et al. ............... 106/404
2004/0131776 A1   7/2004  Weinert .................... 427/255.7
2005/0161678 A1*  7/2005  Weinert et al. ............. 257/77
2005/0252410 A1* 11/2005  Bujard et al. .............. 106/31.9
2005/0287090 A1* 12/2005  Bujard ........................ 424/63
2006/0027139 A1*  2/2006  Bujard et al. ............ 106/31.65

FOREIGN PATENT DOCUMENTS

| EP | 0 803 549 | 10/1997 |
| WO | 93/19131 | 9/1993 |
| WO | 00/43457 | 7/2000 |
| WO | 02/31058 | 4/2002 |
| WO | 03/068868 | 8/2003 |

OTHER PUBLICATIONS

E. Biehl et al., "Reduction of solid silicon monoxide by elemental metals" New J. Chem., Jun. 2001, vol. 25, pp. 994-998.

* cited by examiner

*Primary Examiner*—J. A. Lorengo
*Assistant Examiner*—Pegah Parvini
(74) *Attorney, Agent, or Firm*—Joseph C. Suhadolnik

(57) ABSTRACT

The present invention relates to platelet-shaped pigments comprising (a) a layer obtained by calcination of a layer comprising $SiO_z$ wherein $0.03 \leq z \leq 2.0$ and a metal, to a process for the production thereof, and to the use thereof in paints, text ink-jet printing, cosmetics, coating compositions, plastics, printing inks and in glazes for ceramics and glass. The aforementioned process makes available platelet-shaped pigments having a high degree of planeparallelism and a defined thickness in the range of ±10%, preferably ±5%, of the average thickness.

20 Claims, No Drawings

PLATELET-SHAPED PIGMENTS

The present invention relates to platelet-shaped pigments comprising (a) a layer obtained by calcination of a layer comprising $SiO_z$ wherein $0.03 \leq z \leq 2.0$ and a metal, to a process for the production thereof, and to the use thereof in paints, textiles, ink-jet printing, cosmetics, coating compositions, plastics, printing inks and in glazes for ceramics and glass. The afore-mentioned process makes available platelet-shaped pigments having a high degree of plane-parallelism and a defined thickness in the range of ±10%, preferably ±5%, of the average thickness.

WO93/19131 disclose platelet-shaped colored pigments containing titanium dioxide, one or more suboxides of titanium and an oxide or oxides of one or more metals other than titanium or non-metals, wherein the concentration of the titanium oxides in the coating layer is maximum in the proxity of the substrate surface and gradually decreases toward the pigment surface.

WO00/34395, WO00/69975 and WO02/31058 describe bright metal flakes, $SiO_{y1}/Al/SiO_{y1}$, wherein y1 is from about 1 to about 2. The thickness of the aluminium layer is at least about 40 nm and the thickness of the $SiO_{y1}$ layer is at least 10 nm.

WO03/68868 describes a process for producing $SiO_y$ flakes. The $SiO_y$ flakes may be treated with a carbon-containing gas at from 500 to 1500° C., preferably from 500 to 1000° C., preferably with the exclusion of oxygen, wherein a SiC layer is formed on the $SiO_y$ flakes. Alternatively the $SiO_y$ flakes can be converted in $SiO_2$ flakes by heating them in an oxygen-containing atmosphere. The $SiO_2$ flakes can be used as substrates for interference pigments.

PCT/EP03/09296 discloses platelet-shaped pigments comprising a layer obtained by calcining $TiO_2/SiO_z$, wherein $0.03 \leq z \leq 2.0$, and their use in paints, textiles, ink-jet printing, cosmetics, coatings, plastics materials, printing inks, in glazes for ceramics and glass, and in security printing.

EP-A-803549 discloses colored pigments containing (a) a core consisting of an essentially transparent or metallic reflecting material, and (b) at least a coating consisting essentially of one or more silicone oxides, the molar ratio of oxygen to a silicon being 0.25 to 0.95.

The present invention relates to platelet-shaped pigments, the particles of which generally have a length of from 2 µm to 5 mm, a width of from 2 µm to 2 mm and a thickness of from 20 nm to 1.5 µm and also a ratio of length to thickness of at least 2:1, comprising (a) a layer obtained by calcination of a layer comprising $SiO_z$ wherein $0.03 \leq z \leq 2.0$ and a metal.

The calcination is preferably conducted in a non-oxidizing atmosphere at a temperature above 600° C.

The particles of the platelet-shaped pigments generally have a length of from 2 µm to 5 mm, a width of from 2 µm to 2 mm and a thickness of from 20 nm to 1.5 µm and a ratio of length to thickness of at least 2:1, preferably at least 6.5:1, especially from 50:1 to 500:1. The particles have two substantially parallel faces, the distance between which is the shortest axis of the core. The pigments (flakes) are not of a uniform shape. Nevertheless, for purposes of brevity, the flakes will be referred to as having a "diameter." The flakes have a high plane-parallelism and a defined thickness in the range of ±10%, especially ±5% of the average thickness. The flakes have a thickness of from 20 to 2000 nm, very especially from 100 to 350 nm. It is presently preferred that the diameter of the flakes be in a preferred range of about 1-60 µm with a more preferred range of about 5-40 µm.

Thus, the aspect ratio of the flakes of the present invention is in a preferred range of about 14 to 400.

The platelet-shaped particles can be produced by means of a process comprising a) vapor-deposition of a separating agent layer onto a carrier, b) then, simultaneous vapor-deposition of a metal and $SiO_z$ wherein $0.03 \leq z \leq 2.0$ onto the separating agent layer, c) dissolution of the separating agent in a solvent, d) separation of the product from the solvent and e) calcination of the product in a non-oxidising atmosphere.

Furthermore, the present invention relates also to the platelet-shaped particles obtainable by that process.

The novel pigments can be used especially in automotive finishes, industrial coating compositions, plastics, printing inks and cosmetic formulations.

The pigment particles preferably have lengths and widths of from 5 to 50 µm, especially from 5 to 25 µm, and a thickness of from 60 nm to 1.0 µm.

$SiO_z$ wherein $0.03 \leq z \leq 2.0$ means that the molar ratio of oxygen to silicon is, on average, from 0.03 to 2.0.

Accordingly, $SiO_y$ wherein $0.70 \leq y \leq 1.80$ means that the molar ratio of oxygen to silicon is, on average, from 0.70 to 1.80.

According to the present invention the term a layer comprising $SiO_z$ and a metal means a composite layer of a matrix of $SiO_z$ and embedded therein the metal, but is not intended to comprise multi-layer structures of distinct layers of $SiO_z$ and Al, such as $SiO_z/Al/SiO_z$.

The metal of layer (a) can be, in principal, any metal that at the calcining step reacts with $SiO_z$. Al, Cu, Mo, V, Ag, Cr, Zr, Nb, Ni, Fe, Co, Ti or alloys thereof, such as chromium-nickel, iron-nickel, iron-chromium and nickel-cobalt, are preferred, wherein Al is most preferred.

According to the present invention the term "aluminium" comprises aluminium and alloys of aluminium. Alloys of aluminium are, for example described in G. Wassermann in Ullmanns Enzyklopädie der Industriellen Chemie, 4. Auflage, Verlag Chemie, Weinheim, Band 7, S. 281 to 292. Especially suitable are the corrosion stable aluminium alloys described on page 10 to 12 of WO00/12634, which comprise besides of aluminium silicon, magnesium, manganese, copper, zinc, nickel, vanadium, lead, antimony, tin, cadmium, bismuth, titanium, chromium and/or iron in amounts of less than 20% by weight, preferably less than 10% by weight.

The thickness of the mixed layer is dependent upon the metal used. In the case of co-sublimation of aluminium and $SiO_z$ (z=from 0.03 to 2), where the mixed layer of aluminium and $SiO_z$ forms the core of an interference pigment on which further layers of metal oxides are deposited, the thickness is generally from 5 to 100 nm, preferably from 30 to 60 nm.

Layer (a) preferably forms the core of the pigment. Further layers may be located on only one parallel surface of the core. Preferably, however, the further layers are arranged symmetrically about the core. Platelet-shaped structures which consist solely of a layer obtained by calcination of a layer comprising $SiO_z$ wherein $0.03 \leq z \leq 2.0$ and a metal, especially aluminium, are especially suitable as substrates for interference pigments and form a preferred embodiment (A) of the present invention.

A further subject of the present invention is the use of the pigments in ink-jet printing (PCT/EP03/11189), for dyeing textiles (PCT/EP03/11188), for pigmenting coatings, printing inks, plastics, cosmetics (PCT/EP03/09296), glazes for ceramics and glass and in security printing.

In a preferred embodiment (B), the platelet-shaped pigment comprises (b1) an $SiO_z$ layer, (a) a layer obtained by calcination of a layer comprising $SiO_z$ and a metal, especially aluminium, and (b2) an $SiO_z$ layer, wherein $0.03 \leq z \leq 2.0$.

In this embodiment the layer (a) preferably forms the core of the pigment, wherein the layers (b1) and (b2) are only present on the parallel faces of the core.

The thickness of the $SiO_z$ layer is dependent upon the desired color but is generally from 10 to 1000 nm. A thickness of more than 500 nm results in matt colors.

In one preferred embodiment of the present invention, the interference pigments comprise materials having a "high" index of refraction, which is defined herein as an index of refraction of greater than about 1.65, and optionally materials having a "low" index of refraction, which is defined herein as an index of refraction of about 1.65 or less. Various (dielectric) materials that can be utilized include inorganic materials such as metal oxides, metal suboxides, metal fluorides, metal oxyhalides, metal sulfides, metal chalcogenides, metal nitrides, metal oxynitrides, metal carbides, combinations thereof, and the like, as well as organic dielectric materials. These materials are readily available and easily applied by physical, or chemical vapor deposition processes, or by wet chemical coating processes.

Examples of dielectric materials having a "high" index of refraction are zinc sulfide (ZnS), zinc oxide (ZnO), zirconium oxide ($ZrO_2$), titanium dioxide ($TiO_2$), carbon, indium oxide ($In_2O_3$), indium tin oxide (ITO), tantalum pentoxide ($Ta_2O_5$), chromium oxide ($Cr_2O_3$), cerium oxide ($CeO_2$), yttrium oxide ($Y_2O_3$), europium oxide ($Eu_2O_3$), iron oxides such as iron(II)/iron(III) oxide ($Fe_3O_4$) and iron(III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxides (SiO), selenium trioxide ($Se_2O_3$), tin oxide ($SnO_2$), tungsten trioxide ($WO_3$), or combinations thereof. The dielectric material is preferably a metal oxide. It being possible for the metal oxide to be a single oxide or a mixture of oxides, with or without absorbing properties, for example, $TiO_2$, $ZrO_2$, $Fe_2O_3$, $Fe_3O_4$, $Cr_2O_3$, iron titanate, iron oxide hydrates, titanium suboxides, or ZnO, with $TiO_2$ being especially preferred.

It is possible to obtain pigments that are more intense in color and more transparent by applying, on top of the layer of the dielectric material having a "high" index of refraction, especially a $TiO_2$ layer, a metal oxide of low refractive index. Nonlimiting examples of suitable low index dielectric materials that can be used include silicon dioxide ($SiO_2$), aluminum oxide ($Al_2O_3$), and metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), polymers of perfluoroalkenes, polytetrafluoroethylene (TEFLON), polymers of fluorinated ethylene propylene (FEP), parylene, p-xylene, combinations thereof, and the like. Additionally, the foregoing materials include evaporated, condensed and cross-linked transparent acrylate layers, which may be deposited by methods described in U.S. Pat. No. 5,877,895, the disclosure of which is incorporated herein by reference. $SiO_2$, $Al_2O_3$, AlOOH, $B_2O_3$, or a mixture thereof, are preferred. $SiO_2$ is most preferred.

Especially preferred interference pigments based on embodiment (A) or (B) furthermore comprise, preferably over the entire surface of the pigment, a metal oxide of high refractive index, especially $TiO_2$ or $Fe_2O_3$, and, optionally, additionally on the layer of the metal oxide of high refractive index, a metal oxide, especially $SiO_2$, of low refractive index.

Accordingly, the present invention relates also to platelet-shaped pigments comprising (c1) a layer of a metal oxide of high refractive index, especially $TiO_2$ or $Fe_2O_3$, (b1) optionally, an $SiO_z$ layer, (a) a layer obtained by calcination of a layer comprising $SiO_z$ and a metal, (b2) optionally, an $SiO_z$ layer, wherein $0.03 \leq z \leq 2.0$, and (c2) a layer of a metal oxide of high refractive index, especially $TiO_2$ or $Fe_2O_3$.

In this embodiment the layer (a) preferably forms the core of the pigment, wherein (b1) and (b2) are preferably only present on the parallel faces of the core. The layer (c1) and (c2) of the material of high refractive index, especially $TiO_2$, can be present only on layers (c1) and (c2), but is preferably present on the whole surface of the pigment.

The metal oxide of high refractive index is preferably selected from $TiO_2$, $ZrO_2$, $Fe_2O_3$, $Fe_3O_4$, $Cr_2O_3$, ZnO, and mixtures of those oxides, and an iron titanate, an iron oxide hydrate, a titanium suboxide, and mixtures or mixed phases of those compounds, especially $Fe_2O_3$ and $TiO_2$. The metal oxide of low refractive index is preferably selected from $SiO_2$, $Al_2O_3$, AlOOH, $B_2O_3$ and mixtures thereof, it being possible, optionally, for alkali metal oxides or alkaline-earth metal oxides to be present as additional constituents.

The properties that can be achieved with the novel pigments comprising a layer obtained by calcination of a layer comprising $SiO_z$ and a metal, especially aluminium, can be summarised as follows:

improved substrate properties
  uniform substrate thickness which can be precisely controlled,
  smooth and uniform substrate surface,
  transparent substrate without intrinsic color,
improved reflection and refraction of light,
  improved color strength and color purity,
  new color-changing effects.

Further preferred interference pigments which are based on embodiment (A) or (B) can be coated with one or more layers of metal or metal alloys, the metal or metal alloy being selected, for example, from chromium, nickel, silver, bismuth, copper, tin and Hastelloy (nickel-base alloys), or with a metal sulfide, the latter being, for example, a metal sulfide of tungsten, molybdenum, cerium, lanthanum or rare-earth metals.

When the further layers are layers of metal or metal alloys, the thickness of the core may be from 10 to 1000 nm, depending on the metal used and the desired color, and is preferably less than 500 nm. The further layers may be applied by wet chemical means or by PVD or CVD methods.

Interference pigments based on embodiment (A) or (B) and, optionally, coated by wet chemical means, in the order stated, with $TiO_2$ (core: $SiO_z$/Al; layer: $TiO_2$), $(SnO_2)TiO_2$, $Fe_2O_3$, $Fe_2O_3 \cdot TiO_2$ (core: $SiO_z$/Al; layer mixed layer of $Fe_2O_3$ and $TiO_2$), $TiO_2/Fe_2O_3$ (core $SiO_z$/Al; first layer: $TiO_2$; second layer: $Fe_2O_3$), $TiO_2$/Prussian Blue, $TiO_2$/

$Cr_2O_3$, $TiO_2/FeTiO_3$, $TiO_2/SiO_2/TiO_2$, $(SnO_2)TiO_2/SiO_2/TiO_2$, $TiO_2/SiO_2/TiO_2/SiO_2/TiO_2$ or $TiO_2/SiO_2/Fe_2O_3$ are especially preferred.

The $TiO_2$ may optionally be reduced by means of customary methods: U.S. Pat. No. 4,948,631 ($NH_3$, 750-850° C.), WO93/19131 ($H_2$, >900° C.) or DE-A-198 43 014 (solid reducing agent, for example silicon, >600° C.).

The metal oxide layers can be applied by CVD (chemical vapor deposition) or by wet chemical coating. The metal oxide layers can be obtained by decomposition of metal carbonyls in the presence of water vapor (relatively low molecular weight metal oxides such as magnetite) or in the presence of oxygen and, where appropriate, water vapor (e.g. nickel oxide and cobalt oxide). The metal oxide layers are especially applied by means of oxidative gaseous phase decomposition of metal carbonyls (e.g. iron pentacarbonyl, chromium hexacarbonyl; EP-A-45 851), by means of hydrolytic gaseous phase decomposition of metal alcoholates (e.g. titanium and zirconium tetra-n- and -iso-propanolate; DE-A-41 40 900) or of metal halides (e.g. titanium tetrachloride; EP-A-338 428), by means of oxidative decomposition of organyl tin compounds (especially alkyl tin compounds such as tetrabutyltin and tetramethyltin; DE-A-44 03 678) or by means of the gaseous phase hydrolysis of organyl silicon compounds (especially di-tert-butoxyacetoxysilane) described in EP-A-668 329, it being possible for the coating operation to be carried out in a fluidised-bed reactor (EP-A-045 851 and EP-A-106 235). $Al_2O_3$ layers (B) can advantageously be obtained by controlled oxidation during the cooling of aluminium-coated pigments, which is otherwise carried out under inert gas (DE-A-195 16 181).

Layers of oxides of the metals zirconium, titanium, iron and zinc, oxide hydrates of those metals, iron titanates, titanium suboxides or mixtures thereof are preferably applied by precipitation by a wet chemical method, it being possible, where appropriate, for the metal oxides to be reduced. In the case of the wet chemical coating, the wet chemical coating methods developed for the production of pearlescent pigments may be used; these are described, for example, in DE-A-14 67 468, DE-A-19 59 988, DE-A-20 09 566, DE-A-22 14 545, DE-A-22 15 191, DE-A-22 44 298, DE-A-23 13 331, DE-A-25 22 572, DE-A-31 37 808, DE-A-31 37 809, DE-A-31 51 343, DE-A-31 51 354, DE-A-31 51 355, DE-A-32 11 602 and DE-A-32 35 017, DE 195 99 88, WO 93/08237, WO 98/53001 and WO03/6558.

The metal oxide of high refractive index is preferably $TiO_2$ and the metal oxide of low refractive index is preferably $SiO_2$. Layers of $TiO_2$ can be in the rutile or anastase modification, wherein the rutile modification is preferred. $TiO_2$ layers can also be reduced by known means, for example ammonia, hydrogen, hydrocarbon vapor or mixtures thereof, or metal powders, as described in EP-A-735, 114, DE-A-3433657, DE-A-4125134, EP-A-332071, EP-A-707,050 or WO93/19131.

For coating, the substrate particles are suspended in water or HCl and one or more hydrolysable metal salts are added thereto at a pH value that is suitable for hydrolysis and that is so selected that the metal oxides or metal oxide hydrates are precipitated directly onto the particles without secondary precipitations occurring. The pH value can be kept constant by simultaneous metering-in of a base. The pigments are then separated off, washed and dried and, optionally, calcined, it being possible for the calcinating temperature to be optimised with respect to the particular coating present. If desired, after the application of individual coatings, the pigments can be separated off, dried and, optionally, calcined, before being resuspended for precipitation of the further layers. The coating can furthermore also be carried out in a fluidised-bed reactor by gas-phase coating, for which, for example, the methods proposed in EP-A-0 045 851 and EP-A-0 106 235 for the production of pearlescent pigments can be used accordingly.

In the case of multi-layer pigments, the interference color is determined by the amplification of certain wavelengths and, when a plurality of layers in a multi-layered pigment have the same optical thickness, the color of the reflected light becomes more intense and more saturated the greater the number of layers. In addition, by suitably selecting the layer thicknesses, an especially great variation in color depending on the viewing angle can be achieved. A pronounced color flop is formed, which may be desirable for the pigments according to the invention. The thickness of the individual metal oxide layers, irrespective of their refractive index, is therefore from 20 to 500 nm, preferably from 50 to 300 nm.

For application of the titanium dioxide layers, preference is given to the method described in U.S. Pat. No. 3,553,001.

An aqueous titanium salt solution is slowly added to a suspension of the material being coated, which suspension has been heated to approximately 50-100° C., especially 70-80° C., and a substantially constant pH value of approximately from 0.5 to 5, especially approximately from 1.5 to 2.5, is maintained by simultaneous metering-in of a base, for example aqueous ammonia solution or aqueous alkali metal hydroxide solution. As soon as the desired layer thickness of precipitated $TiO_2$ has been achieved, the addition of titanium salt solution and base is stopped. That method, also referred to as a titration method, is distinguished by the fact that an excess of titanium salt is avoided. That is achieved by feeding in for hydrolysis, per unit of time, only that amount which is necessary for even coating with the hydrated $TiO_2$ and which can be taken up per unit of time by the available surface of the particles being coated. Accordingly, hydrated titanium dioxide particles are not formed and not precipitated onto the surface being coated. The anastase form of $TiO_2$ is obtained by that method. The rutile form of $TiO_2$ can be obtained by depositing $SnO_2$ before depositing the $TiO_2$ layer and calcining the pigment at approximately from 700 to 900° C. It is also possible to precipitate nano-$TiO_2$ of the rutile type having particle sizes of from 1 to 50 nm by means of hydrolysis of $TiCl_4$ using hydrochloric acid at temperatures of from 0 to 60° C. (Lit: R. J. Nussbaumer, W. Caseri, T. Tervoort and P. Smith, *Journal of Nanoparticle Research* 2002, 4, 319-323; Anpo et al. *J. Phys. Chem.* 1987, 91, 4305). It is likewise possible to precipitate nano-$TiO_2$ of the anastase type having particle sizes of from 10 to 40 nm (crystallite size: <10 nm) by hydrolysis of $Ti(OiPr)_4$ (=titanium tetraisopropoxide) using water at from 0 to 50° C. and subsequently separating off the isopropanol formed, at temperatures of from 50 to 100° C. and a slight vacuum (p about 200 torr) (Lit: K. I. Gnanasekar et al. *Journal of Materials Research* 2002, 17(6), 1507-1512). It is likewise possible for a solution of titanic acid, prepared from $TiCl_4$ by hydrolysis using ammonium hydroxide and subsequent oxidation using $H_2O_2$, to be added to an aqueous solution of the $Al/SiO_z$ flakes; by heating at from 100 to 250° C. there are spontaneously formed from that solution nano-$TiO_2$ particles of the anastase type having particles sizes of about 10 nm (Lit: H. Ichinose, M. Terasaki and H. Katsuki, *Journal of the Ceramic Society of Japan, Int. Edition* 1996, 104(8), 715-718). Such solutions and dispersions have now also become commercially available (Kon Corporation, 91-115 Miyano Yamauchi, Kishimagun Saga-prefecture, Japan 849-2305).

The Al/SiO$_z$ flakes coated with titanium, zirconium or iron can be subsequently coated with organic or inorganic compounds by known methods.

For application of the silicon dioxide layers, the following method may be used: a soda waterglass solution is metered in to a suspension of the material being coated, which suspension has been heated to approximately from 50 to 100° C., especially from 70 to 80° C.

The pH value is kept constant at from 4 to 10, preferably from 6.5 to 8.5, by simultaneously adding 10% hydrochloric acid. After addition of the waterglass solution, stirring is carried out for a further 30 minutes.

To enhance the weather and light stability the multilayer flakes can be, depending on the field of application, subjected to a surface treatment. Useful surface treatments are, for example, described in DE-C-2215191, DE-A-3151354, DE-A-3235017, DE-A-3334598, DE-A-4030727, EP-A-649886, WO97/29059, WO99/57204, and U.S. Pat. No. 5,759,255. Said surface treatment might also facilitate the handling of the pigment, especially its incorporation into various application media.

Furthermore, interference pigments based on embodiment (A) or (B) may have a thin semi-transparent metal layer on one parallel surface, preferably on both parallel surfaces. The metal layer is typically from 5 to 25 nm thick and especially from 5 to 15 nm thick and consists of, for example, Cr, Ti, Mo, W, Al, Cu, Ag, Au, or Ni.

The semitransparent metal layer can be applied by PVD. Alternatively the metal layer can be obtained by wet chemical coating or by chemical vapor deposition, for example, gas phase deposition of metal carbonyls. The substrate is suspended in an aqueous and/or organic solvent containing medium in the presence of a metal compound and is deposited onto the substrate by addition of a reducing agent. The metal compound is, for example, silver nitrate or nickel acetyl acetonate (WO03/37993).

According to U.S. Pat. No. 3,536,520 nickel chloride can be used as metal compound and hypophosphite can be used as reducing agent. According to EP-A-353544 the following compounds can be used as reducing agents for the wet chemical coating: aldehydes (formaldehyde, acetaldehyde, benzalaldehyde), ketones (acetone), carboxylic acids and salts thereof (tartaric acid, ascorbic acid), reductones (isoascorbic acid, triosereductone, reductic acid), and reducing sugars (glucose).

Calcination of the pigments includes calcination of the pigments in a non-oxidising gas atmosphere and, where appropriate, in an oxygen-containing atmosphere. Calcination of the pigments in a non-oxidising gas atmosphere, for example Ar and/or He, preferably Ar, is carried out at a temperature of more than 600° C., preferably in the range from 700 to 1100° C., for more than 10 minutes, preferably for several hours, where appropriate under reduced pressure, preferably less than 0.9333 10$^5$ N/m$^2$ (700 torr). Calcination may be carried out after coating with the metal oxide of high refractive index but is preferably performed before coating with the metal oxide of high refractive index.

The platelet-shaped material may be produced in a multiplicity of differentiable and reproducible variants by varying only two process parameters: the thickness of the vacuum coating of the mixed layer of metal and SiO$_z$, and the proportion of metal embedded in the mixed layer.

The mixed layer and the separating agent layer are applied by vapor-deposition, the metal being admixed with the SiO$_z$ by means of simultaneous vaporization in vacuo. The ratio of metal, especially aluminium, to SiO$_z$ is generally less than 60% by weight, preferably less than or equal to 50% by weight. When Al and SiO$_z$ are vaporized simultaneously, preference is given to conversion of all the aluminium into Al$^{3+}$ by means of calcination:

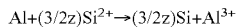

It is assumed, that by calcining of metal/SiO$_z$ in a non-oxidizing atmosphere a composite layer is obtained, whereby a change of the refractive index is caused. It is assumed, that the change of the refractive index is based on the oxidation of the metal by SiO$_z$. It is, for example, known that by heating of SiO and aluminium at 650° C. Si and Al$_2$O$_3$ are formed and that by heating of SiO and titanium at 900° C. titanium silicides are formed (New J. Chem., 2001, 25, 994-998).

Production is especially simple when the mixed layer is produced by two vaporizers whose vapor jets overlap so that the mixed layer is produced in the overlapping region. As an alternative thereto, vaporization may also be carried out by means of a single vaporizer which vaporizes the two components simultaneously or alternately.

The materials are produced by means of vapor-deposition methods by heating and vaporizing the substances to be vaporized in vacuo in the pressure range from 1 to 10$^{-3}$ Pa. The vapors condense on the cold substrate surfaces to form the desired thin layers. VaporizationVaporization is carried out either in metal containers (boats of tungsten, molybdenum or tantalum plate) which are heated directly by passing current through, or by bombardment with electron beams.

In the case of the sputtering method or cathode atomisation, a gas discharge (plasma) is ignited between the carrier and the coating material, which is in the form of plates (target). The coating material is bombarded with high-energy ions from the plasma, for example argon ions, and, as a result, is removed and atomised. The atoms or molecules of the atomised coating material are deposited on the carrier and form the desired thin layer.

Metals or alloys are especially suitable for the sputtering method. They can be atomised at a high rate, especially in the so-called DC magnetron method. Compounds such as oxides or suboxides or mixtures of oxides may also be atomised by using high-frequency sputtering. The chemical composition of the layers is governed by the composition of the coating material (target) but may also be influenced by additions to the gas forming the plasma. In particular, oxide or nitrite layers are produced by adding oxygen or nitrogen to the gas space (see, for example, U.S. Pat. No. 5,440,446 and EP-A-0 733 919).

Preference is given to the use as vaporizers of resistance-heated vaporizers, vaporizers heated by electron beams, inductively heated vaporizers or arc-operated vaporizers.

In order to simplify separation, the carrier material should have a smooth or structured surface. Especially suitable carrier materials have been found to be a polyimide film or a metal foil or a combination of those materials. Preference is given to the carrier material being in the form of a circulating belt, as described in U.S. Pat. No. 6,270,840, so that continuous production of material is made possible.

The separating agent condensed onto the carrier may be a coating, a polymer, such as a (thermoplastic) polymer described, for example in U.S. Pat. No. 6,398,999, e.g. acrylic or styrene polymers or mixtures thereof, an organic substance soluble in organic solvents or in water and vaporizable in vacuo, such as anthracene, anthraquinone, acetamidophenol, acetylsalicylic acid, camphoric anhydride, benzimidazole, benzene-1,2,4-tricarboxylic acid, biphenyl-2,2-dicarboxylic acid, bis(4-hydroxyphenyl)sulfone, dihydroxyanthraquinone, hydantoin, 3-hydroxybenzoic acid, 8-hydroxyquinoline-5-sulfonic acid monohydrate, 4-hydroxycoumarin, 7-hydroxycoumarin, 3-hydroxynaphthalene-2-carboxylic acid, isophthalic acid, 4,4-methylene-bis-3-hydroxynaphthalene-2-carboxylic acid, naphthalene-1,8-dicarboxylic anhydride, phthalimide and its potassium salt, phenolphthalein, phenothiazine, saccharin and its salts, tetraphenylmethane, triphenylene, triphenylmethanol or a mixture of at least two of those substances. The separating agent is preferably a water-soluble inorganic salt vaporizable in vacuo (see, for example, DE 198 44 357), such as sodium chloride, potassium chloride, lithium chloride, sodium fluoride, potassium fluoride, lithium fluoride, calcium fluoride, sodium aluminium fluoride or disodium tetraborate.

Preferred embodying examples of the invention will be described in greater detail hereinbelow.

In a preferred embodying example of the process according to the invention, the following are applied one after the other in vacuo, preferably in the pressure range from 1 to $10^{-3}$ Pa, by thermal vaporization according to the PVD method:
  a separating agent layer and
  a mixed layer, arranged on top of the separating agent, which layer comprises the metal together with a freely selectable proportion of SiOz introduced by simultaneous vaporization from a further source or from the same source.

In the process according to the invention, it is, in principle, possible to use any inorganic metal that reacts, during calcination, with the $SiO_z$ present in the mixed layer. Preference is given to nickel, iron, cobalt, silver, chromium, zirconium, niobium, molybdenum, vanadium, titanium or alloys thereof, such as chromium-nickel, iron-nickel, iron-chromium and nickel-cobalt; special preference is given to the use of aluminium. Vaporization of alloys is advantageously carried out from separate sources having the required molar ratio.

An especially preferred embodiment of the present invention is aimed at the production of $SiO_y$/Al flakes wherein $0.70 \leq y \leq 1.8$, especially $1.0 \leq y \leq 1.8$:

In detail, a salt, for example NaCl, followed by a layer of silicon suboxide ($SiO_y$) and aluminium are vapor-deposited onto a carrier, which may be a continuous metal belt, passing by way of the vaporizers under a vacuum of >0.5 Pa. The mixed layer of silicon suboxide ($SiO_y$) and aluminium is obtained by means of two vaporizers, each of which is charged with one of the two materials and the vapor cones of which overlap, the metal being admixed in proportions of from 1 to 50 mol % of the mixed layer. The vapor-deposited thicknesses of separating agent (especially salt) are about from 20 to 100 nm, preferably from 30 to 60 nm, while those of the mixed layer are, depending on the use for which the product is intended, from 10 to 1000 nm. On its further course, the belt-form carrier, which is closed to form a loop, runs through dynamic vacuum lock chambers of known mode of construction (cf. U.S. Pat. No. 6,270,840) into a region of from 1 to $5 \times 10^4$ Pa pressure, preferably from 600 to $10^9$ Pa pressure, and especially from $10^3$ to $5 \times 10^3$ Pa pressure, where it is immersed in a dissolution bath. The temperature of the solvent therein should be so selected that its vapor pressure is in the indicated pressure range. With mechanical assistance, the separating agent layer rapidly dissolves and the product layer breaks up into flakes, which are then present in the solvent in the form of a suspension. In a preferred embodiment, NaCl is used as the separating agent of the separating agent layer, the NaCl dissolving in water. On its further course, the belt is dried and freed from any contaminants still adhering to it. It runs through a second group of dynamic vacuum lock chambers back into the vaporization chamber, where the process of coating with separating agent and mixed layer of $SiO_y$/separating agent is repeated.

The suspension then present, comprising product structures, solvent, and the separating agent dissolved therein, is then separated in a further operation in accordance with a known technique. For that purpose, the product structures are first concentrated in the liquid and rinsed several times with fresh solvent in order to wash out the dissolved separating agent. The product, in the form of a solid that is still wet, is then separated off by filtration, sedimentation, centrifugation, decanting or evaporation.

In accordance with a further preferred embodying example, the following are applied one after the other in vacuo, preferably in the pressure range from 1 to $10^{-3}$ Pa, by thermal vaporization according to the PVD method:
  a separating agent layer
  an $SiO_y$ layer on top of the separating agent,
  a mixed layer, arranged on top of the $SiO_y$ layer, which layer comprises aluminium together with a freely selectable proportion of $SiO_z$ introduced by simultaneous vaporization from a further source or from the same source, and
  an $SiO_y$ layer on top of the mixed layer.

The $SiO_{1.00-1.8}$ layer is formed preferably from silicon monoxide vapor produced in the vaporizer by reaction of a mixture of Si and $SiO_2$ at temperatures of more than 1300° C. The $SiO_{0.70-0.99}$ layer is formed preferably by evaporating silicon monoxide containing silicon in an amount up to 20% by weight at temperatures of more than 1300° C.

If, under industrial vacuums of a few $10^{-2}$ Pa, Si is vaporized instead of SiO, silicon oxides that have a less-than-equimolar oxygen content are obtained, that is to say $SiO_x$ wherein $0.03 \leq x \leq 0.95$, especially $0.05 \leq x \leq 0.5$.

The thickness of each $SiO_y$ layer in that embodiment varies from 10 to 1000 nm. The preferred thickness is dependent upon the desired color. An $SiO_z$ layer thickness greater than about 500 nm results in matt colors.

Further preferred subject-matter of the present invention consists of the particles obtainable by the process described hereinbefore and having the following layer structure: $SiO_y$/(mixed layer of $SiO_y$ and Al=core)/$SiO_y$, which may be calcined in a non-oxidative atmosphere. Calcination of those flakes is carried out under a protective gas atmosphere, for example helium or argon, where appropriate under reduced pressure (<0.93 $10^5$ Pa ), at a temperature of more than 600° C., preferably in the range from 700 to 1100C., for more than 10 minutes, preferably more than two hours.

After calcination, the product can be subjected to oxidative heat treatment. Known methods are available for that purpose. Air or some other oxygen-containing gas is passed through the plane-parallel structures, which are in the form of loose material or in a fluidised bed, at a temperature of more than 200° C., preferably more than 400° C. and especially from 500 to 1000° C. The product can then be brought to the desired particle size by means of ultrasound or by mechanical means using high-speed stirrers in a liquid medium, or after drying the fragments in an air-jet mill having a rotary classifier, or means of grinding or air-sieving and delivered for further use.

For the further processing of the flakes coated with $SiO_y$, different variants are possible:

Variant (1) ($TiO_2$/$SiO_y$/core'/$SiO_z$/$TiO_2$, Wherein Core' is a Layer Obtained by Calcination of a Layer Consisting of $SiO_y$ and Al):

The SiO$_y$-coated platelets (SiO$_y$/(mixed layer of SiO$_y$ and Al=core)/SiO$_y$) are calcined in a non-oxidizing gaseous atmosphere at a temperature above 600° C., preferably in the range of from 700 to 1100° C. for more then 10 minutes, preferably for several hours. The calcination is conducted in a non-oxidizing gaseous atmosphere, such as, for example, Ar and/or He, wherein Ar is preferred, optionally under reduced pressure, preferably a pressure of less than 700 Torr (0,9333 10$^5$ N/m$^2$).

The obtained platelets can then be subjected to oxidative heat treatment. For example, air or some other oxygen-containing gas is passed through the platelets, which are in the form of loose material or in a fluidized bed, at a temperature of more than 200° C., preferably more than 400° C. and especially from 500 to 1000° C., wherein SiO$_y$ is oxidized to SiO$_z$.

The TiO$_2$ coating can easily be applied to the SiO$_y$-coated metal platelets by physical, or chemical vapor deposition processes, or by wet chemical coating processes.

For the purpose of coating, the substrate particles are suspended in water and one or more hydrolysable titanium salts are added at a pH suitable for the hydrolysis, which is so selected that the metal oxides or metal oxide hydrates are precipitated directly onto the particles without subsidiary precipitation occurring. The pH is usually kept constant by simultaneously metering in a base. The pigments are then separated off, washed, dried and, where appropriate, calcined, it being possible to optimize the calcining temperature with respect to the coating in question. If desired, after individual coatings have been applied, the pigments can be separated off, dried and, where appropriate, calcined, and then again re-suspended for the purpose of precipitating further layers.

In accordance with an embodiment of the present invention, the method described in U.S. Pat. No. 3,553,001 is used for application of the titanium dioxide layers.

An aqueous titanium salt solution is slowly added to a suspension of the material being coated, which suspension has been heated to about 50-100° C., especially 70-80° C., and a substantially constant pH value of about from 0.5 to 5, especially about from 1.2 to 2.5, is maintained by simultaneously metering in a base such as, for example, aqueous ammonia solution or aqueous alkali metal hydroxide solution. As soon as the desired layer thickness of precipitated TiO$_2$ has been achieved, the addition of titanium salt solution and base is stopped.

This method, also referred to as a titration method, is distinguished by the fact that an excess of titanium salt is avoided. That is achieved by feeding in for hydrolysis, per unit time, only that amount which is necessary for even coating with the hydrated TiO$_2$ and which can be taken up per unit time by the available surface of the particles being coated. In principle, the anatase form of TiO$_2$ forms on the surface of the starting pigment. By adding small amounts of SnO$_2$, however, it is possible to force the rutile structure to be formed. For example, as described in WO 93/08237, tin dioxide can be deposited before titanium dioxide precipitation and the product coated with titanium dioxide can be calcined at from 800 to 900° C.

It is possible for the weathering resistance to be increased by means of an additional coating, which at the same time causes an optimal adaptation to the binder system (EP-A-268918 and EP-A-632109).

Variant (2) (TiO$_2$/layer (E)/SiO$_z$/core'/SiO$_z$/layer (E)/TiO$_2$:

As described above the SiO$_y$-coated platelets (SiO$_y$/(mixed layer of SiO$_y$ and Al=core)/SiO$_y$) are coated with TiO$_2$ and then calcined in a non-oxidizing atmosphere. In this way an additional layer (E) is produced besides the layer (a), which is formed by calcination of TiO$_2$/SiO$_y$. It is assumed that calcining TiO$_2$/SiO$_y$ in a non-oxidizing atmosphere produces an intermediate layer that causes a change in the refractive index. However, the possibility that the intermediate layer is not a continuous layer and that, rather, only individual regions at the interface of TiO$_2$ and SiO$_y$ undergo a conversion that causes a change in the refractive index cannot be ruled out. It is further assumed that the change in the refractive index is due to the reduction of TiO$_2$ by SiO$_y$.

The principle according to the invention is based, therefore, on producing, by reduction of TiO$_2$ with SiO$_y$, an intermediate layer that causes a change in the refractive index.

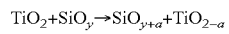

$$TiO_2 + SiO_y \rightarrow SiO_{y+a} + TiO_{2-a}$$

Accordingly, further preferred embodiments of the present invention are directed to pigments having a layer structure, TiO$_2$/SiO$_z$/core/SiO$_z$/TiO$_2$, wherein the SiO$_z$ layer is only present on the plane-parallel faces, but not the side faces and the TiO$_2$ layer is applied to the whole surface; as well as pigments having a layer structure, TiO$_2$/layer (E)/SiO$_z$/core/SiO$_z$/layer (E)/TiO$_2$, wherein the SiO$_z$ layer and the layer (E) is only present on the plane-parallel faces, but not the side faces and the TiO$_2$ layer is applied to the whole surface.

Alternatively, pigments can be obtained by the following methods:

Variant (3): calcination in a non-oxidizing atmosphere (→layer (a)), coating of the obtained pigments with TiO$_2$ (TiO$_2$/SiO$_y$/core'/SiO$_y$/TiO$_2$) and optionally calcination in the presence of oxygen (SiO$_y$→SiO$_z$) (TiO$_2$/SiO$_z$/core'/SiO$_z$/TiO$_2$).

Variant (4): calcination in a non-oxidizing atmosphere (→layer (a)), coating of the obtained pigments with TiO$_2$, calcination in a non-oxidizing atmosphere (→layer (E)) (TiO$_2$/layer (E)/SiO$_y$/core'/SiO$_y$/layer (E)/TiO$_2$) and optionally calcination in the presence of oxygen (SiO$_y$→SiO$_z$) (TiO$_2$/layer (E)/SiO$_z$/core'/SiO$_z$/layer (E)/TiO$_2$).

If desired, the TiO$_2$ can be reduced to titanium suboxides by usual methods, as described, for example in U.S. Pat. No. 4,948,631, JP H4-20031, DE-A-19618562 and DE-A-198 43 014).

It is possible to obtain pigments that are more intense in color and more transparent by applying, on top of the TiO$_2$ layer, a metal oxide of "low" refractive index, that is to say a refractive index smaller than about 1.65, such as SiO$_2$, Al$_2$O$_3$, AlOOH, B$_2$O$_3$ or a mixture thereof, preferably SiO$_2$, and applying a further Fe$_2$O$_3$ and/or TiO$_2$ layer on top of the latter layer. Such multi-coated interference pigments comprising a silicon oxide substrate and alternating metal oxide layers of with high and low refractive index can be prepared in analogy to the processes described in WO98/53011 and WO99/20695.

Where appropriate, an SiO$_2$ (protective) layer can be applied on top of the titanium dioxide layer, for which the following method may be used: A soda water glass solution is metered in to a suspension of the material being coated, which suspension has been heated to about 50-100° C., especially 70-80° C. The pH is maintained at from 4 to 10, preferably from 6.5 to 8.5, by simultaneously adding 10% hydrochloric acid. After addition of the water glass solution, stirring is carried out for 30 minutes.

It is, in addition, possible to modify the powder color of the pigment by applying further layers such as, for example, colored metal oxides or Berlin Blue, compounds of transition metals, e.g. Fe, Cu, Ni, Co, Cr, or organic compounds such as dyes or color lakes.

It is furthermore possible to subject the finished pigment to subsequent coating or subsequent treatment which further increases the light, weather and chemical stability or which facilitates handling of the pigment, especially its incorporation into various media. For example, the procedures described in DE-A-22 15 191, DE-A-31 51 354, DE-A-32 35 017, DE-A-33 34 598, DE-A-4030727, EP-A-649886, WO97/29059, WO99/57204, and U.S. Pat. No. 5,759,255 are suitable as subsequent treatment or subsequent coating.

In addition, the pigment according to the invention can also be coated with poorly soluble, firmly adhering, inorganic or organic colorants. Preference is given to the use of color lakes and, especially, aluminum color lakes. For that purpose an aluminum hydroxide layer is precipitated, which is, in a second step, laced by using a color lake (DE-A-24 29 762 and DE 29 28 287).

Furthermore, the pigment according to the invention may also have an additional coating with complex salt pigments, especially cyan ferrate complexes (EP-A-141 173 and DE-A-23 13 332).

After the $SiO_y$-coated flakes ($SiO_y$/(mixed layer of $SiO_y$ and Al=core)/$SiO_y$) have been calcined, as described in Variant (1), in a non-oxidizing gaseous atmosphere at a temperature above 600° C., preferably in the range of from 700 to 1100° C. for more than 10 minutes, preferably for several hours, they can also be caused to react in a gas-tight reactor heatable to a maximum of about 1500° C., preferably in the form of loose material, with a carbon-containing gas selected from alkynes, for example acetylene, alkenes, for example methane, alkenes, aromatic compounds or the like, and mixtures thereof optionally in admixture with an oxygen containing compound, such as, for example, aldehydes, ketones, water, carbon monoxide, carbon dioxide or the like, or mixtures thereof, at from 500 to 1500° C., preferably from 500 to 1000° C., and advantageously with the exclusion of oxygen. In order to temper the reaction, an inert gas, for example argon or helium, may be admixed with the carbon-containing gas (WO03/68868).

At pressures of less than about 1 Pa the reaction generally also proceeds too slowly whereas, especially when the carbon-containing gases are less reactive or are highly diluted with inert gas, it is perfectly possible to operate at pressures of up to about 4000 bar, as are routinely used, for example, in HIP ("hot isocratic pressing") systems.

In such carbonization, it is possible for all of the $SiO_y$ to be reacted to form SiC; preferably from 5 to 90% by weight of the $SiO_y$ are reacted to form SiC. The temperature for the process of conversion of $SiO_y$ to SiC is from 500° to 1500° C., preferably from 500° C. to 1000° C., with a process duration of from about one hour to about twenty hours. The reaction takes place starting from the surface of the plane-parallel structures and accordingly results in a gradient rather than a sharp transition. This means that, in that embodiment, the SiC-containing layer consists of $(SiO_y)_a$ and $(SiC)_b$, wherein $0 \leq a \leq 1$ and $0 \leq b \leq 1$, with b being 1 and a being 0 close to the surface of the pigment and the amount of SiC approaching 0 close to the boundary with the $SiO_y$ substrate. The $SiO_y$ structures are sufficiently porous for such a reaction not to be limited only to the uppermost layer of $SiO_y$ molecules.

According to this process variant pigments having the following layer structure, $SiC/SiO_y$/core'/$SiO_y$/SiC, can be obtained, which can be converted to pigments having the following layer structure, $SiC/SiO_z$/core'/$SiO_z$/SiC, by calcination in the presence of oxygen. The pigments obtained by this process are new and are a further subject of the present invention.

Instead of a layer of a metal oxide having a high index of refraction U.S. Pat. No. 6,524,381 materials, such as diamond-like carbon and amorphous carbon, can be deposited by plasma-assisted vacuum methods (using vibrating conveyors, rotating drum coaters, oscillatory drum coaters, and free-fall chambers) as described, for example in U.S. Pat. No. 6,524,381, on the $SiO_z$-coated substrates.

Consequently, the present invention also relates to plane-parallel structures (pigments) based on $SiO_z$/core'/$SiO_z$ substrates having on their surface a carbon layer especially a diamond-like carbon layer having a thickness of 5 to 150 nm, especially 20 to 50 nm.

In the method described, for example, in U.S. Pat. No. 6,015,597, diamond-like network (DLN) coatings are deposited onto particles from carbon-containing gases, such as, for example, acetylene, methane, butadiene and mixtures of these and optionally Ar, and optionally gases containing additional components by plasma deposition. Deposition occurs at reduced pressures (relative to atmospheric pressure) and in a controlled environment. A carbon rich plasma is created in a reaction chamber by applying an electric field to a carbon-containing gas. Particles to be coated are held in a vessel or container in the reactor and are agitated while in proximity to the plasma. Species within the plasma react on the particle surface to form covalent bonds, resulting in DLN on the surface of the particles.

The term "diamond-like network" (DLN) refers to amorphous films or coatings comprised of carbon and optionally comprising one or more additional components selected from the group consisting of hydrogen, nitrogen, oxygen, fluorine, silicon, sulfur, titanium, and copper. The diamond-like networks comprise approximately 30 to 100 atomic percent carbon, with optional additional components making up the remainder.

The platelet-shaped Al/$SiO_z$ particles may be used, for example, as substrates for effect pigments. The further layers necessary for interference effects may be applied in accordance with customary methods, already described in greater detail hereinbefore, that are known for effect pigments having mica, $SiO_2$ or $Al_2O_3$ cores.

The pigments according to the invention are distinguished by high gloss and a very uniform thickness, as a result of which very high color purity and color strength are achieved. The pigments according to the invention can be used for all customary purposes, for example for coloring textiles, polymers in the mass, coatings (including effect finishes, including those for the automotive sector), glazes for ceramics and glass, and printing inks (including security printing), and also, for example, for applications in cosmetics and in ink-jet printing. Such applications are known from reference works, for example "Industrielle Organische Pigmente" (W. Herbst and K. Hunger, VCH Verlagsgesellschaft mbH, Weinheim/N.Y., 2nd, completely revised edition, 1995).

Metallic or non-metallic, inorganic platelet-shaped particles or pigments are effect pigments, (especially metal effect pigments or interference pigments), that is to say, pigments that, besides imparting color to an application medium, impart additional properties, for example angle dependency of the color (flop), lustre (not surface gloss) or texture. On metal effect pigments, substantially oriented reflection occurs at directionally oriented pigment particles. In the case of interference pigments, the color-imparting effect is due to the phenomenon of interference of light in thin, highly refractive layers.

When the pigments according to the invention are interference pigments (effect pigments), they are goniochromatic and result in brilliant, highly saturated (lustrous) colors. They are accordingly very especially suitable for combination with conventional, transparent pigments, for example organic pigments such as, for example, diketopyrrolopyrroles, quinacridones, dioxazines, perylenes, isoindolinones etc., it being possible for the transparent pigment to have a similar color to the effect pigment. Especially interesting combination effects are obtained, however, in analogy to, for example, EP 388 932 or EP 402 943, when the color of the transparent pigment and that of the effect pigment are complementary.

The pigments according to the invention can be used with excellent results for pigmenting high molecular weight organic material.

The high molecular weight organic material for the pigmenting of which the pigments or pigment compositions according to the invention may be used may be of natural or synthetic origin. High molecular weight organic materials usually have molecular weights of about from $10^3$ to $10^8$ g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

From the series of the polyaddition resins and polycondensation resins there may be mentioned, for example, condensation products of formaldehyde with phenols, so-called phenoplasts, and condensation products of formaldehyde with urea, thiourea or melamine, so-called aminoplasts, and the polyesters used as coating resins, either saturated, such as alkyd resins, or unsaturated, such as maleate resins; also linear polyesters and polyamides, polyurethanes or silicones.

The said high molecular weight compounds may be present singly or in mixtures, in the form of plastic masses or melts. They may also be present in the form of their monomers or in the polymerised state in dissolved form as film-formers or binders for coatings or printing inks, such as, for example, boiled linseed oil, nitrocellulose, alkyd resins, melamine resins and urea-formaldehyde resins or acrylic resins.

Depending on the intended purpose, it has proved advantageous to use the pigments or pigment compositions according to the invention as toners or in the form of preparations. Depending on the conditioning method or intended application, it may be advantageous to add certain amounts of texture-improving agents to the pigment before or after the conditioning process, provided that this has no adverse effect on use of the effect pigments for colouring high molecular weight organic materials, especially polyethylene. Suitable agents are, especially, fatty acids containing at least 18 carbon atoms, for example stearic or behenic acid, or amides or metal salts thereof, especially magnesium salts, and also plasticisers, waxes, resin acids, such as abietic acid, rosin soap, alkylphenols or aliphatic alcohols, such as stearyl alcohol, or aliphatic 1,2-dihydroxy compounds containing from 8 to 22 carbon atoms, such as 1,2-dodecanediol, and also modified colophonium maleate resins or fumaric acid colophonium resins. The texture-improving agents are added in amounts of preferably from 0.1 to 30% by weight, especially from 2 to 15% by weight, based on the end product.

The pigments according to the invention can be added in any tinctorially effective amount to the high molecular weight organic material being pigmented. A pigmented substance composition comprising a high molecular weight organic material and from 0.01 to 80% by weight, preferably from 0.1 to 30% by weight, based on the high molecular weight organic material; of an pigment according to the invention is advantageous. Concentrations of from 1 to 20% by weight, especially of about 10% by weight, can often be used in practice. High concentrations, for example those above 30% by weight, are usually in the form of concentrates ("masterbatches") which can be used as colorants for producing pigmented materials having a relatively low pigment content, the pigments according to the invention having an extraordinarily low viscosity in customary formulations so that they can still be processed well.

For the purpose of pigmenting organic materials, the pigments according to the invention may be used singly. It is, however, also possible, in order to achieve different hues or color effects, to add any desired amounts of other color-imparting constituents, such as white, colored, black or effect pigments, to the high molecular weight organic substances in addition to the effect pigments according to the invention. When colored pigments are used in admixture with the effect pigments according to the invention, the total amount is preferably from 0.1 to 10% by weight, based on the high molecular weight organic material. Especially high goniochromicity is provided by the preferred combination of an effect pigment according to the invention with a colored pigment of another color, especially of a complementary color, with colorations made using the effect pigment and colorations made using the colored pigment having, at a measurement angle of 10°, a difference in hue ($\Delta H^*$) of from 20 to 340, especially from 150 to 210.

Preferably, the effect pigments according to the invention are combined with transparent colored pigments, it being possible for the transparent colored pigments to be present either in the same medium as the effect pigments according to the invention or in a neighbouring medium. An example of an arrangement in which the effect pigment and the colored pigment are advantageously present in neighbouring media is a multi-layer effect coating.

The pigmenting of high molecular weight organic substances with the pigments according to the invention is carried out, for example, by admixing such a pigment, where appropriate in the form of a masterbatch, with the substrates using roll mills or mixing or grinding apparatuses. The pigmented material is then brought into the desired final form using methods known per se, such as calendering, compression moulding, extrusion, coating, pouring or injection moulding. Any additives customary in the plastics industry, such as plasticisers, fillers or stabilisers, can be added to the polymer, in customary amounts, before or after incorporation of the pigment. In particular, in order to produce non-rigid shaped articles or to reduce their brittleness, it is desirable to add plasticisers, for example esters of phosphoric acid, phthalic acid or sebacic acid, to the high molecular weight compounds prior to shaping.

For pigmenting coatings and printing inks, the high molecular weight organic materials and the pigments according to the invention, where appropriate together with customary additives such as, for example, fillers, other pigments, siccatives or plasticisers, are finely dispersed or dissolved in the same organic solvent or solvent mixture, it being possible for the individual components to be dissolved or dispersed separately or for a number of components to be dissolved or dispersed together, and only thereafter for all the components to be brought together.

Dispersing a pigment according to the invention in the high molecular weight organic material being pigmented, and processing a pigment composition according to the invention, are preferably carried out subject to conditions under which only relatively weak shear forces occur so that the effect pigment is not broken up into smaller portions.

The colorations obtained, for example in plastics, coatings or printing inks, especially in coatings or printing inks, more especially in coatings, are distinguished by excellent properties, especially by extremely high saturation, outstanding fastness properties and high goniochromicity.

When the high molecular weight material being pigmented is a coating, it is especially a speciality coating, very especially an automotive finish.

The pigments according to the invention are also suitable for making-up the lips or the skin and for colouring the hair or the nails.

The invention accordingly relates also to a cosmetic preparation or formulation comprising from 0.0001 to 90% by weight of the silicon/silicon oxide flakes and/or of a pigment according to the invention and from 10 to 99.9999% of a cosmetically suitable carrier material, based on the total weight of the cosmetic preparation or formulation.

Such cosmetic preparations or formulations are, for example, lipsticks, blushers, foundations, nail varnishes and hair shampoos.

The pigments may be used singly or in the form of mixtures. It is, in addition, possible to use pigments according to the invention together with other pigments and/or colorants, for example in combinations as described hereinbefore or as known in cosmetic preparations.

The cosmetic preparations and formulations according to the invention preferably contain the pigment according to the invention in an amount from 0.005 to 50% by weight, based on the total weight of the preparation.

Suitable carrier materials for the cosmetic preparations and formulations according to the invention include the customary materials used in such compositions.

The cosmetic preparations and formulations according to the invention may be in the form of, for example, sticks, ointments, creams, emulsions, suspensions, dispersions, powders or solutions. They are, for example, lipsticks, mascara preparations, blushers, eye-shadows, foundations, eyeliners, powder or nail varnishes.

If the preparations are in the form of sticks, for example lipsticks, eye-shadows, blushers or foundations, the preparations consist for a considerable part of fatty components, which may consist of one or more waxes, for example ozokerite, lanolin, lanolin alcohol, hydrogenated lanolin, acetylated lanolin, lanolin wax, beeswax, candelilla wax, microcrystalline wax, carnauba wax, cetyl alcohol, stearyl alcohol, cocoa butter, lanolin fatty acids, petrolatum, petroleum jelly, mono-, di- or tri-glycerides or fatty esters thereof that are solid at 25° C., silicone waxes, such as methyloctadecane-oxypolysiloxane and poly(dimethylsiloxy)-stearoxysiloxane, stearic acid monoethanolamine, colophane and derivatives thereof, such as glycol abietates and glycerol abietates, hydrogenated oils that are solid at 25° C., sugar glycerides and oleates, myristates, lanolates, stearates and dihydroxystearates of calcium, magnesium, zirconium and aluminium.

The fatty component may also consist of a mixture of at least one wax and at least one oil, in which case the following oils, for example, are suitable: paraffin oil, purcelline oil, perhydrosqualene, sweet almond oil, avocado oil, calophyllum oil, castor oil, sesame oil, jojoba oil, mineral oils having a boiling point of about from 310 to 410° C., silicone oils, such as dimethylpolysiloxane, linoleyl alcohol, linolenyl alcohol, oleyl alcohol, cereal grain oils, such as wheatgerm oil, isopropyl lanolate, isopropyl palmitate, isopropyl myristate, butyl myristate, cetyl myristate, hexadecyl stearate, butyl stearate, decyl oleate, acetyl glycerides, octanoates and decanoates of alcohols and polyalcohols, for example of glycol and glycerol, ricinoleates of alcohols and polyalcohols, for example of cetyl alcohol, isostearyl alcohol, isocetyl lanolate, isopropyl adipate, hexyl laurate and octyl dodecanol.

The fatty components in such preparations in the form of sticks may generally constitute up to 99.91% by weight of the total weight of the preparation.

The cosmetic preparations and formulations according to the invention may additionally comprise further constituents, such as, for example, glycols, polyethylene glycols, polypropylene glycols, monoalkanolamides, non-colored polymeric, inorganic or organic fillers, preservatives, UV filters or other adjuvants and additives customary in cosmetics, for example a natural or synthetic or partially synthetic di- or tri-glyceride, a mineral oil, a silicone oil, a wax, a fatty alcohol, a Guerbet alcohol or ester thereof, a lipophilic functional cosmetic active ingredient, including sun-protection filters, or a mixture of such substances.

A lipophilic functional cosmetic active ingredient suitable for skin cosmetics, an active ingredient composition or an active ingredient extract is an ingredient or a mixture of ingredients that is approved for dermal or topical application. The following may be mentioned by way of example:

active ingredients having a cleansing action on the skin surface and the hair; these include all substances that serve to cleanse the skin, such as oils, soaps, synthetic detergents and solid substances;

active ingredients having a deodorising and perspiration-inhibiting action: they include antiperspirants based on aluminium salts or zinc salts, deodorants comprising bactericidal or bacteriostatic deodorising substances, for example triclosan, hexachlorophene, alcohols and cationic substances, such as, for example, quaternary ammonium salts, and odour absorbers, for example ®Grillocin (combination of zinc ricinoleate and various additives) or triethyl citrate (optionally in combination with an antioxidant, such as, for example, butyl hydroxytoluene) or ion-exchange resins;

active ingredients that offer protection against sunlight (UV filters): suitable active ingredients are filter substances (sunscreens) that are able to absorb UV radiation from sunlight and convert it into heat; depending on the desired action, the following light-protection agents are preferred: light-protection agents that selectively absorb sunburn-causing high-energy UV radiation in the range of approximately from 280 to 315 nm (UV-B absorbers) and transmit the longer-wavelength range of, for example, from 315 to 400 nm (UV-A range), as well as light-protection agents that absorb only the longer-wavelength radiation of the UV-A range of from 315 to 400 nm (UV-A absorbers); suitable light-protection agents are, for example, organic UV absorbers from the class of the p-aminobenzoic acid derivatives, salicylic acid derivatives, benzophenone derivatives, dibenzoylmethane derivatives, diphenyl acrylate derivatives, benzofuran derivatives, polymeric UV absorbers comprising one or more organosilicon radicals, cinnamic acid derivatives, camphor derivatives, trianilino-s-triazine derivatives, phenyl-benzimidazolesulfonic acid and salts thereof, menthyl anthranilates, benzotriazole derivatives, and/or an inorganic micropigment selected from aluminium oxide- or silicon dioxide-coated $TiO_2$, zinc oxide or mica;

active ingredients against insects (repellents) are agents that are intended to prevent insects from touching the skin and becoming active there; they drive insects away and evaporate slowly; the most frequently used repellent is diethyl toluamide (DEET); other common repellents will be found, for example, in "Pflegekosmetik" (W. Raab and U. Kindl, Gustav-Fischer-Verlag Stuttgart/New York,1991) on page 161;

active ingredients for protection against chemical and mechanical influences: these include all substances that form a barrier between the skin and external harmful substances, such as, for example, paraffin oils, silicone oils, vegetable oils, PCL products and lanolin for protection against aqueous solutions, film-forming agents, such as sodium alginate, triethanolamine alginate, polyacrylates, polyvinyl alcohol or cellulose ethers for protection against the effect of organic solvents, or substances based on mineral oils, vegetable oils or silicone oils as "lubricants" for protection against severe mechanical stresses on the skin;

moisturising substances: the following substances, for example, are used as moisture-controlling agents (moisturisers): sodium lactate, urea, alcohols, sorbitol, glycerol, propylene glycol, collagen, elastin and hyaluronic acid;

active ingredients having a keratoplastic effect: benzoyl peroxide, retinoic acid, colloidal sulfur and resorcinol;

antimicrobial agents, such as, for example, triclosan or quaternary ammonium compounds;

oily or oil-soluble vitamins or vitamin derivatives that can be applied dermally: for example vitamin A (retinol in the form of the free acid or derivatives thereof), panthenol, pantothenic acid, folio acid, and combinations thereof, vitamin E (tocopherol), vitamin F; essential fatty acids; or niacinamide (nicotinic acid amide);

vitamin-based placenta extracts: active ingredient compositions comprising especially vitamins A, C, E, $B_1$, $B_2$, $B_6$, $B_{12}$, folic acid and biotin, amino acids and enzymes as well as compounds of the trace elements magnesium, silicon, phosphorus, calcium, manganese, iron or copper;

skin repair complexes: obtainable from inactivated and disintegrated cultures of bacteria of the bifidus group;

plants and plant extracts: for example arnica, aloe, beard lichen, ivy, stinging nettle, ginseng, henna, camomile, marigold, rosemary, sage, horsetail or thyme;

animal extracts: for example royal jelly, propolis, proteins or thymus extracts;

cosmetic oils that can be applied dermally: neutral oils of the Miglyol 812 type, apricot kernel oil, avocado oil, babassu oil, cottonseed oil, borage oil, thistle oil, groundnut oil, gamma-oryzanol, rosehip-seed oil, hemp oil, hazelnut oil, blackcurrant-seed oil, jojoba oil, cherry-stone oil, salmon oil, linseed oil, cornseed oil, macadamia nut oil, almond oil, evening primrose oil, mink oil, olive oil, pecan nut oil, peach kernel oil, pistachio nut oil, rape oil, rice-seed oil, castor oil, safflower oil, sesame oil, soybean oil, sunflower oil, tea tree oil, grapeseed oil or wheatgerm oil.

The preparations in stick form are preferably anhydrous but may in certain cases comprise a certain amount of water which, however, in general does not exceed 40% by weight, based on the total weight of the cosmetic preparation.

If the cosmetic preparations and formulations according to the invention are in the form of semi-solid products, that is to say in the form of ointments or creams, they may likewise be anhydrous or aqueous. Such preparations and formulations are, for example, mascaras, eyeliners, foundations, blushers, eye-shadows, or compositions for treating rings under the eyes.

If, on the other hand, such ointments or creams are aqueous, they are especially emulsions of the water-in-oil type or of the oil-in-water type that comprise, apart from the pigment, from 1 to 98.8% by weight of the fatty phase, from 1 to 98.8% by weight of the aqueous phase and from 0.2 to 30% by weight of an emulsifier.

Such ointments and creams may also comprise further conventional additives, such as, for example, perfumes, antioxidants, preservatives, gel-forming agents, UV filters, colorants, pigments, pearlescent agents, non-colored polymers as well as inorganic or organic fillers.

If the preparations are in the form of a powder, they consist substantially of a mineral or inorganic or organic filler such as, for example, talcum, kaolin, starch, polyethylene powder or polyamide powder, as well as adjuvants such as binders, colorants etc.

Such preparations may likewise comprise various adjuvants conventionally employed in cosmetics, such as fragrances, antioxidants, preservatives etc.

If the cosmetic preparations and formulations according to the invention are nail varnishes, they consist essentially of nitrocellulose and a natural or synthetic polymer in the form of a solution in a solvent system, it being possible for the solution to comprise other adjuvants, for example pearlescent agents.

In that embodiment, the colored polymer is present in an amount of approximately from 0.1 to 5% by weight.

The cosmetic preparations and formulations according to the invention may also be used for coloring the hair, in which case they are used in the form of shampoos, creams or gels that are composed of the base substances conventionally employed in the cosmetics industry and a pigment according to the invention.

The cosmetic preparations and formulations according to the invention are prepared in conventional manner, for example by mixing or stirring the components together, optionally with heating so that the mixtures melt.

The Examples that follow illustrate the invention without limiting the scope thereof. Unless otherwise indicated, percentages and parts are percentages and parts by weight, respectively.

EXAMPLES

Example 1

A flat piece of glass measuring 4×4 cm is placed, as target material, in a vacuum chamber (BAK 600, Balzers AG), in which various introduced substances can be vaporized using, as desired, an electron gun or Joule heating. First, at a pressure of 1.33 10$^{-2}$ Pa, a mixed layer of metallic aluminium and SiO is built up from introduced aluminium (Joule heating, 1400 to 1500° C.) and silicon oxide (electron gun), the vapor jets of which overlap, at a vapor-deposition rate of 0.2 nm/second; a TiO$_2$ layer is then vapor-deposited (electron gun) on top of that layer from introduced titanium dioxide.

The layer thickness of the SiO/Al layer and the TiO$_2$ layer is determined using a micro-scanning device and the stoichiometry of the SiO layer is determined by ESCA. The reflection color (CIE-L*C*h) is measured under illumination with D$_{65}$ standard light at viewing angles of 10° and 45°. The layer thicknesses of the SiO/Al layer and the TiO$_2$ layer of samples 1 and 2 obtained in accordance with Example 1 are given in Table 1. The reflection colors of samples 1 and 2 at viewing angles of 10° and 45° are given in Table 2.

Example 2

Example 1 is repeated but, instead of aluminium and silicon oxide, aluminium and silicon dioxide are vaporized. The layer thicknesses of the SiO$_2$/Al layer and the TiO$_2$ layer of sample 3 obtained in accordance with Example 2 are given in Table 1. The reflection colors of sample 3 at viewing angles of 10° and 45° are given in Table 2.

Example 3

Example 2 is repeated but, instead of titanium dioxide, silicon dioxide is vaporized and, in addition, silicon oxide is vaporized after the silicon dioxide. The layer thicknesses of the SiO$_2$/Al layer, SiO$_2$ layer and the SiO layer of sample 4 obtained in accordance with Example 3 are given in Table 1. The reflection colors of sample 4 at viewing angles of 10° and 45° are given in Table 2.

In Examples 1 to 3, vaporization is so controlled that the weight ratio of aluminium to SiO and/or SiO$_2$ is about 50:50.

TABLE 1

| Example | Sample | Carrier | 1st layer | 2nd layer | 3rd layer |
|---|---|---|---|---|---|
| 1 | 1 | glass | 30 nm Al/SiO | 192 nm TiO$_2$ | — |
| 1 | 2 | glass | 28 nm Al/SiO | 192 nm TiO$_2$ | — |
| 2 | 3 | glass | 118 nm Al/SiO$_2$ | 192 nm TiO$_2$ | — |
| 3 | 4 | glass | 118 nm Al/SiO$_2$ | 330 nm SiO$_2$ | 50 nm SiO |

TABLE 2

| Sample | Viewing angle [°] | L* | a | b | C* | h |
|---|---|---|---|---|---|---|
| 1 | 10 | 75.4 | −33.5 | −17.2 | 37.6 | 207.2 |
| 1 | 45 | 69.8 | −14.1 | −29.2 | 32.5 | 244.3 |
| 2 | 10 | 62.7 | −44.1 | −23.1 | 49.8 | 207.6 |
| 2 | 45 | 55.8 | −21.2 | −36.5 | 42.2 | 239.9 |
| 3 | 10 | 99 | −8.7 | 34.3 | 35.4 | 104.2 |
| 3 | 45 | 98 | −13.5 | 27.4 | 30.6 | 116.3 |
| 4 | 10 | 82.7 | −42.2 | 13.7 | 44.3 | 162 |
| 4 | 45 | 78 | 39.3 | −7 | 39.9 | 349.9 |

Example 4

Samples 2 and 3 are heated at 650° C. under argon for 2 hours. The reflection colours of samples 2' and 3' obtained in that manner, at viewing angles of 10° and 45°, are given in Table 3.

TABLE 3

| Sample | Viewing angle [°] | L* | a | b | C* | h |
|---|---|---|---|---|---|---|
| 2' | 10 | 52.5 | −22.6 | −11.9 | 25.5 | 207.8 |
| 2' | 45 | 50.1 | −14 | −20.1 | 24.5 | 235.2 |
| 3' | 10 | 56.4 | −33.3 | 11.6 | 35.3 | 160.8 |
| 3' | 45 | 57.6 | −38 | −6.9 | 38.7 | 190.3 |

The invention claimed is:

1. A platelet-shaped pigment the particles of which generally have a length of from 2 μm to 5 mm, a width of from 2 μm to 2 mm and a thickness of from 20 nm to 1.5 μm and also a ratio of length to thickness of at least 2:1, comprising
    (a) a layer obtained by calcination in a non-oxidizing atmosphere at a temperature above 600° C. of a composite layer comprising a matrix of SiO$_z$ wherein $0.03 \leq z \leq 2.0$ and embedded therein a metal.

2. A platelet-shaped pigment according to claim 1, wherein layer (a) forms the core of the pigment.

3. A platelet-shaped pigment according to claim 1, comprising
    (b1) a SiO$_z$ layer,
    (a) a layer obtained by calcination of a layer comprising SiO$_z$ and a metal, and
    (b2) a SiO$_z$ layer, wherein $0.03 \leq z \leq 2.0$.

4. A platelet-shaped pigment according to claim 2, comprising
    (c1) a layer of a metal oxide of high refractive index, especially TiO$_2$,
    (b1) optionally, a SiO$_z$ layer,
    (a) a layer obtained by calcination of a layer comprising SiO$_z$ and a metal,
    (b2) optionally, a SiO$_z$ layer, wherein $0.03 \leq z \leq 2.0$, and
    (c2) a layer of a metal oxide of high refractive index, especially TiO$_2$; or
    (c1) a carbon layer,
    (b1) a SiO$_z$ layer,
    (a) a layer obtained by calcination of a layer comprising SiO$_z$ and a metal,
    (b2) a SiO$_z$ layer, wherein $0.03 \leq z \leq 2.0$, and
    (c2) a carbon layer; or
    (c1) a layer comprising silicon carbide (SiC),
    (b1) a SiO$_z$ layer,
    (a) a layer obtained by calcination of a layer comprising SiO$_z$ and a metal,
    (b2) a SiO$_z$ layer, wherein $0.03 \leq z \leq 2.0$, and
    (c2) a layer comprising silicon carbide (SiC).

5. A platelet-shaped pigment according to claim 1, wherein $0.03 \leq z \leq 0.95$.

6. A platelet-shaped pigment according to claim 1, wherein $0.95 \leq z \leq 2.0$.

7. A platelet-shaped pigment according to claim 1, wherein the metal is Al, Cu, Mo, V, Ag, Cr, Zr, Nb, Ni, Fe, Co, Ti or alloys thereof.

8. A process for the production of a pigment according to claim 1, comprising
    a) vapor-deposition of a separating agent layer onto a carrier,
    b) then, simultaneous vapour-deposition of a metal and SiO$_z$ wherein $0.03 \leq z \leq 2.0$ onto the separating agent layer,
    c) dissolution of the separating agent in a solvent,
    d) separation of the product from the solvent and
    e) calcination in a non-oxidizing atmosphere at a temperature above 600° C. of the product.

9. A process according to claim 8, wherein $1.0 \leq z \leq 1.8$.

10. A process according to claim 9, wherein in step b) an $SiO_z$/metal layer is vapor-deposited by means of two separate vaporizers, one vaporizer having a charge comprising a mixture of Si and $SiO_2$, $SiO_z$ or a mixture thereof, wherein $1.0 \leq z \leq 1.8$, and the other vaporizer having a charge of metal.

11. A platelet-shaped pigment obtained by the process according to claim 8.

12. A paint, textile, ink-jet printing, cosmetic, coating, plastics or printing ink composition or a glaze for ceramics and glass comprising a pigment according to claim 1.

13. A platelet-shaped pigment according to claim 2, wherein $0.03 \leq z \leq 0.95$.

14. A platelet-shaped pigment according to claim 2, wherein $0.95 \leq z \leq 2.0$.

15. A platelet-shaped pigment according to claim 2, wherein the metal is Al, Cu, Mo, V, Ag, Cr, Zr, Nb, Ni, Fe, Co, Ti or alloys thereof.

16. A platelet-shaped pigment according to claim 3, wherein the metal is Al, Cu, Mo, V, Ag, Cr, Zr, Nb, Ni, Fe, Co, Ti or alloys thereof.

17. A platelet-shaped pigment according to claim 4, wherein the metal is Al, Cu, Mo, V, Ag, Cr, Zr, Nb, Ni, Fe, Co, Ti or alloys thereof.

18. A platelet-shaped pigment according to claim 1, wherein the metal is aluminium.

19. A platelet-shaped pigment obtained by the process according to claim 9.

20. A paint, textile, ink-jet printing, cosmetic, coating, plastic or printing ink composition or a glaze for ceramics and glass comprising a pigment according to claim 11.

* * * * *